US007916432B2

(12) United States Patent
Ohta et al.

(10) Patent No.: US 7,916,432 B2
(45) Date of Patent: Mar. 29, 2011

(54) THIN-FILM PATTERNING METHOD FOR MAGNETORESISTIVE DEVICE

(75) Inventors: Naoki Ohta, Tokyo (JP); Kazuki Sato, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 662 days.

(21) Appl. No.: 12/000,285

(22) Filed: Dec. 11, 2007

(65) Prior Publication Data
US 2009/0145878 A1   Jun. 11, 2009

(51) Int. Cl.
*G11B 5/33* (2006.01)
*G11B 5/127* (2006.01)

(52) U.S. Cl. .................. 360/324.1; 360/324.2; 360/313; 360/314; 360/315; 438/706; 438/707; 438/722

(58) Field of Classification Search .................. None
See application file for complete search history.

(56) References Cited

U.S. PATENT DOCUMENTS

| 6,879,470 B2 | 4/2005 | Johnson et al. |
| 6,943,409 B1 * | 9/2005 | Cheng et al. ............... 257/330 |
| 7,723,807 B2 * | 5/2010 | Nishiyama ............... 257/401 |

FOREIGN PATENT DOCUMENTS

| JP | A-05-342527 | 12/1993 |
| JP | A-2000-076618 | 3/2000 |
| JP | A-2001-110663 | 4/2001 |
| JP | A-2002-175606 | 6/2002 |
| JP | A-2003-017353 | 1/2003 |
| WO | WO 01/33558 A1 | 5/2001 |

* cited by examiner

*Primary Examiner* — Duy-Vu N Deo
(74) *Attorney, Agent, or Firm* — Oliff & Berridge, PLC

(57) ABSTRACT

The thin-film patterning method for a magnetoresistive device comprises forming a functional layer on a substrate; forming a first mask layer above the functional layer; forming a patterned resist on the first mask layer; etching the first mask layer by using the resist; removing the resist; forming a second mask layer by atomic layer deposition, the second mask layer covering a step defined by an edge of the first mask layer; dry-etching the second mask layer in a thickness direction of the substrate so as to leave the second mask layer on a side face of the step; removing the first mask layer so as to expose the functional layer under the first mask; and dry-etching the functional layer by using the second mask layer.

4 Claims, 14 Drawing Sheets

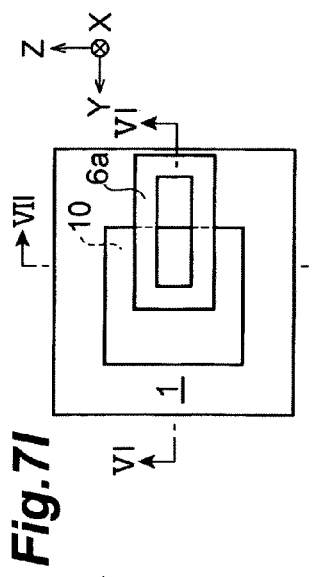
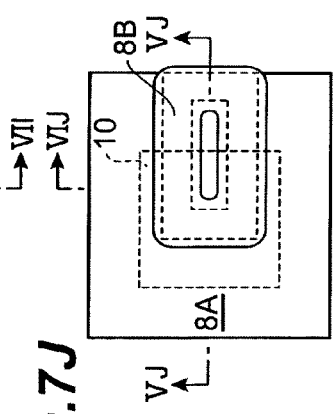
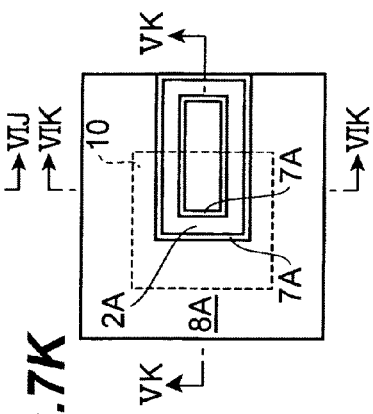
*Fig.7I* *Fig.7J* *Fig.7K*
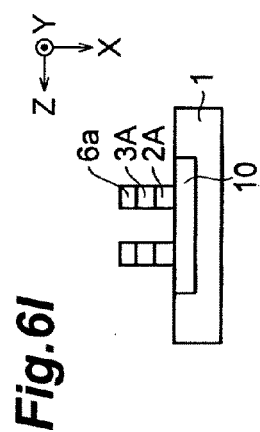
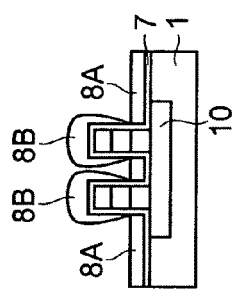
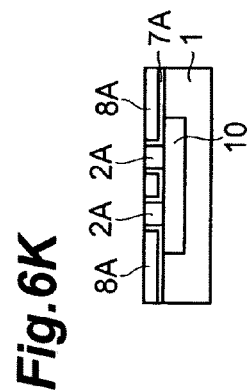
*Fig.6I* *Fig.6J* *Fig.6K*
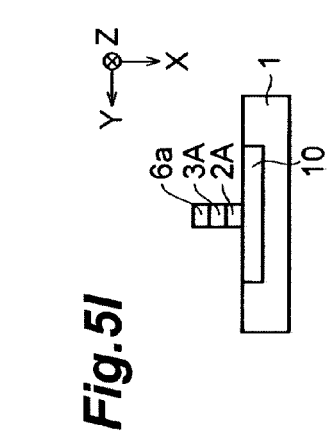
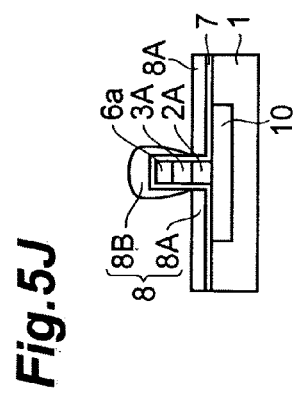
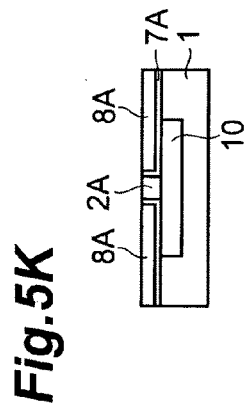
*Fig.5I* *Fig.5J* *Fig.5K*

THIN-FILM PATTERNING METHOD FOR MAGNETORESISTIVE DEVICE

BACKGROUND OF THE INVENTION

1. Field of the Invention

The present invention relates to a thin-film patterning method for a magnetoresistive device.

2. Related Background Art

Conventional thin-film patterning methods for thin-film magnetic heads and the like having magnetoresistive devices, for example, are described in Japanese Patent Application Laid-Open Nos. 2002-175606, 2003-17353, 2003-512941, 2000-76618, 2001-110663, and 5-342527, for example. These methods can perform thin-film patterning of thin-film magnetic heads and the like.

SUMMARY OF THE INVENTION

However, further precise patterning on atomic layer order has been demanded in thin films such as recent magnetoresistive devices. Namely, required MR track widths have been becoming narrower, thereby necessitating higher performances in exposure apparatus. This also makes the apparatus cost considerable. It is necessary to find a method for forming a required track width by a known apparatus. Therefore, forming a narrow pattern by utilizing a step between an edge in a peripheral part of a photoresist and a substrate surface is considered. Namely, a mask layer is formed so as to cover the step and then etched from the surface side, whereby the mask layer remains only on side faces of the step. Thereafter, the photoresist is removed, whereby a mask layer vertically projecting from the substrate surface is formed. Etching the substrate by using this mask layer can form a pattern having a width matching the thickness of the mask layer on the substrate surface.

If the thickness of the mask layer is further reduced in order to make the line width thinner, influences of irregularities in the side faces of the edge in the photoresist cannot be neglected. Namely, incident and reflected light components of exposure light interfere with each other at the time of exposing the photoresist to light, so that a stationary wave occurs at an edge of the photoresist, whereby irregularities caused by exposure to the stationary wave are formed on side faces of the edge. Since such irregularities cannot completely be removed even by heat treatment after the exposure, the mask layer is formed on irregular side faces of the photoresist, whereby the line width cannot be made thinner. Using the method of the present invention can form, in principle, a required track width with a high precision and a reduced fluctuation even in a known apparatus.

Therefore, the thin-film patterning method for a magnetoresistive device in accordance with the present invention comprises the steps of (a) forming a functional layer on a substrate; (b) forming a first mask layer above the functional layer; (c) forming a patterned resist on the first mask layer; (d) etching the first mask layer by using the resist; (e) removing the resist; (f) forming a second mask layer by atomic layer deposition (ALD), the second mask layer covering a step defined by an edge of the first mask layer; (g) dry-etching the second mask layer in a thickness direction of the substrate so as to leave the second mask layer on a side face of the step; (h) removing the first mask layer so as to expose the functional layer under the first mask; and (i) dry-etching the functional layer by using the second mask layer.

Since a side face of a step of the first mask layer has a flatness higher than that of a step of a resist, the thickness of the second mask layer formed on the former side face by ALD is controlled on atomic layer order. The functional layer is etched with its width direction aligning with the thickness direction of the second mask layer, and thus is formed with a width on atomic layer order. Examples of the functional layer having such a width include not only magnetoresistive devices, but also semiconductor devices and metal wires.

An etching stop layer made of a material exhibiting a lower etching rate to an etching gas in step (i) than that of the first mask layer may be formed on the functional layer before forming the first mask layer. Such a method is effective in particular when the thickness in the track width direction of the second mask layer is 80 nm or less at the final stage of the process.

The functional layer may constitute a TMR device having a tunnel barrier layer between ferromagnetic material layers.

BRIEF DESCRIPTION OF THE DRAWINGS

FIG. 5I is a sectional view of a TMR device intermediate for explaining the manufacturing method in accordance with the embodiment;

FIG. 5J is a sectional view of a TMR device intermediate for explaining the manufacturing method in accordance with the embodiment;

FIG. 5K is a sectional view of a TMR device intermediate for explaining the manufacturing method in accordance with the embodiment;

FIG. 6I is a sectional view of the TMR device intermediate for explaining the manufacturing method in accordance with the embodiment;

FIG. 6J is a sectional view of the TMR device intermediate for explaining the manufacturing method in accordance with the embodiment;

FIG. 6K is a sectional view of the TMR device intermediate for explaining the manufacturing method in accordance with the embodiment;

FIG. 7I is a plan view of the TMR device intermediate for explaining the manufacturing method in accordance with the embodiment;

FIG. 7J is a plan view of the TMR device intermediate for explaining the manufacturing method in accordance with the embodiment;

FIG. 7K is a plan view of the TMR device intermediate for explaining the manufacturing method in accordance with the embodiment;

DESCRIPTION OF THE PREFERRED EMBODIMENTS

Figure 1:
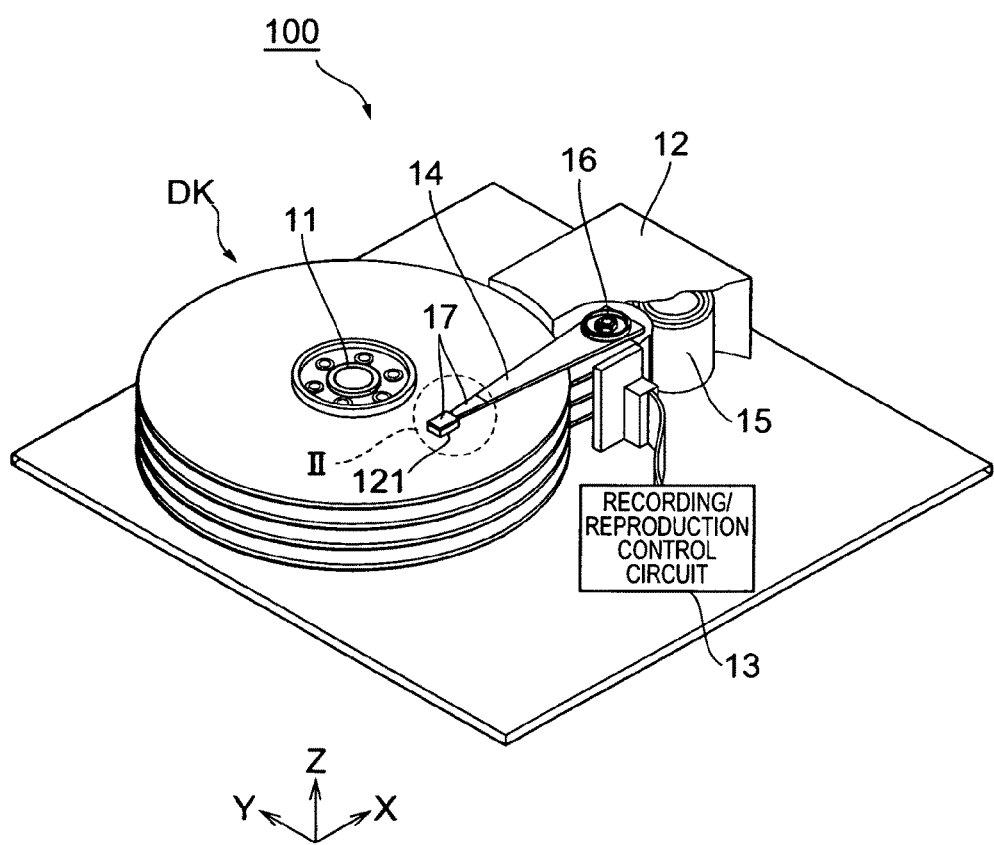
FIG. 1 is a perspective view of a hard disk drive in accordance with an embodiment.

In the following, the patterning method for a thin-film magnetic head having a magnetoresistive device in accordance with an embodiment will be explained. The same elements are denoted by the same reference numbers in each drawing. The dimensional ratios in and among constituents in the drawings are arbitrary for the convenience of viewing the drawings. The magnetic head is mounted to a head gimbal assembly (HGA) of a hard disk drive. The overall structure of each element will be explained hereinafter.

Hard Disk Drive

FIG. 1 is a perspective view of the hard disk drive in accordance with the embodiment.

The hard disk drive 100 comprises magnetic disks (magnetic recording media) DK which are a plurality of magnetic recording media rotating about a rotary shaft of a spindle motor 11, an assembly carriage device 12 for positioning magnetic heads 121 on tracks, and a recording/reproduction control circuit 13 for controlling writing and reading actions of the magnetic head 121

The assembly carriage device 12 is provided with a plurality of driving arms 14. The driving arms 14, which can be swung about a pivot bearing shaft 16 by a voice coil motor (VCM) 15, are laminated in a direction along this shaft 16. A head gimbal assembly (HGA) 17 is attached to a leading end part of each driving arm 14. Each HGA 17 is provided with a magnetic head 121 opposing the front face of its corresponding magnetic disk DK. The surface of the magnetic head 121 opposing the front face of the magnetic disk DK is its medium-opposing surface S (see FIG. 2; also known as air bearing surface). The magnetic disk DK, driving arm 14, HGA 17, and magnetic head 121 may be singular as well.

An orthogonal coordinate system is set here. Let Z axis be the direction of the rotary axis of the spindle motor 11 rotating the magnetic disks DK, and X and Y axes be orthogonal two axes which are perpendicular to the Z axis and define the front face of each magnetic disk DK. The front face of the magnetic disk DK and the medium-opposing surface S (see FIG. 2) are parallel to each other. The HGA 17 extends along the X axis, while the track width direction in the magnetic disk DK at the position of the magnetic head 121 aligns with the Y-axis direction.

HGA

Figure 2:
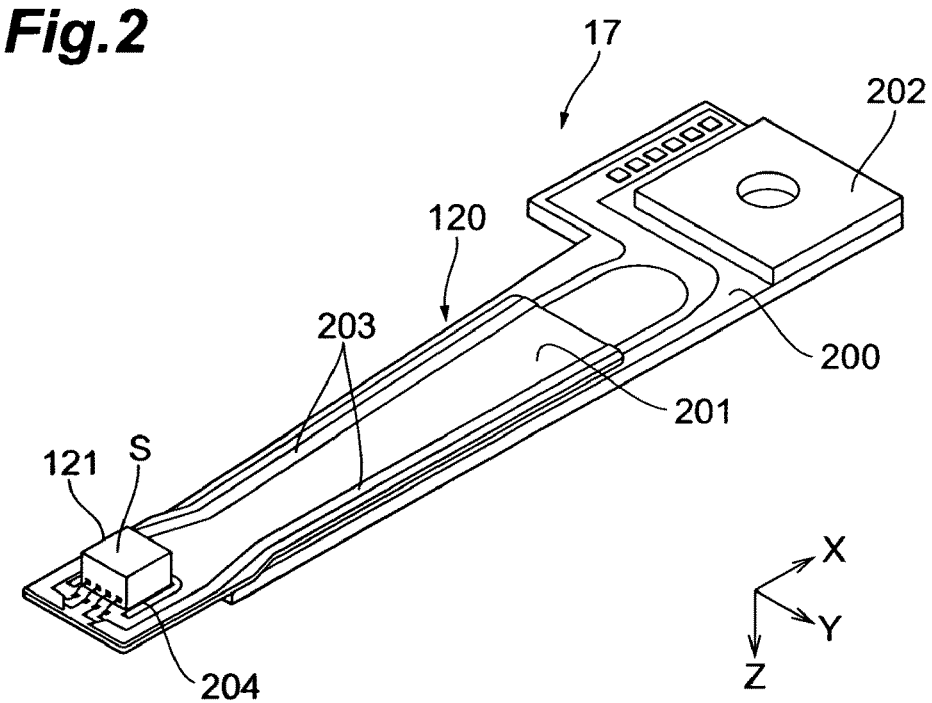
FIG. 2 is a perspective view of an HGA.

FIG. 2 is a perspective view of the HGA 17. This drawing is illustrated such that the medium-opposing surface S of the HGA 17 faces up.

The HGA 17 is constructed such that the magnetic head 121 is firmly attached to a leading end part of a suspension 120, while respective one ends of wiring members 203 are electrically connected to terminal electrodes of the magnetic head 121. The suspension 120 is mainly constituted by a load beam 200; an elastic flexure 201 firmly attached onto and supported by the load beam 200; a tongue 204 formed like a leaf spring at the leading end of the flexure 201; a base plate 202 provided in a base part of the load beam 200; and the wiring members 203, provided on the flexure 201, each comprising a lead conductor and connection pads electrically connected to both ends thereof.

It is clear that the structure of the suspension in the HGA 17 is not limited to the one set forth in the foregoing. Though not depicted, a head driving IC chip may be mounted somewhere in the suspension 120.

Magnetic Head

Figure 3:
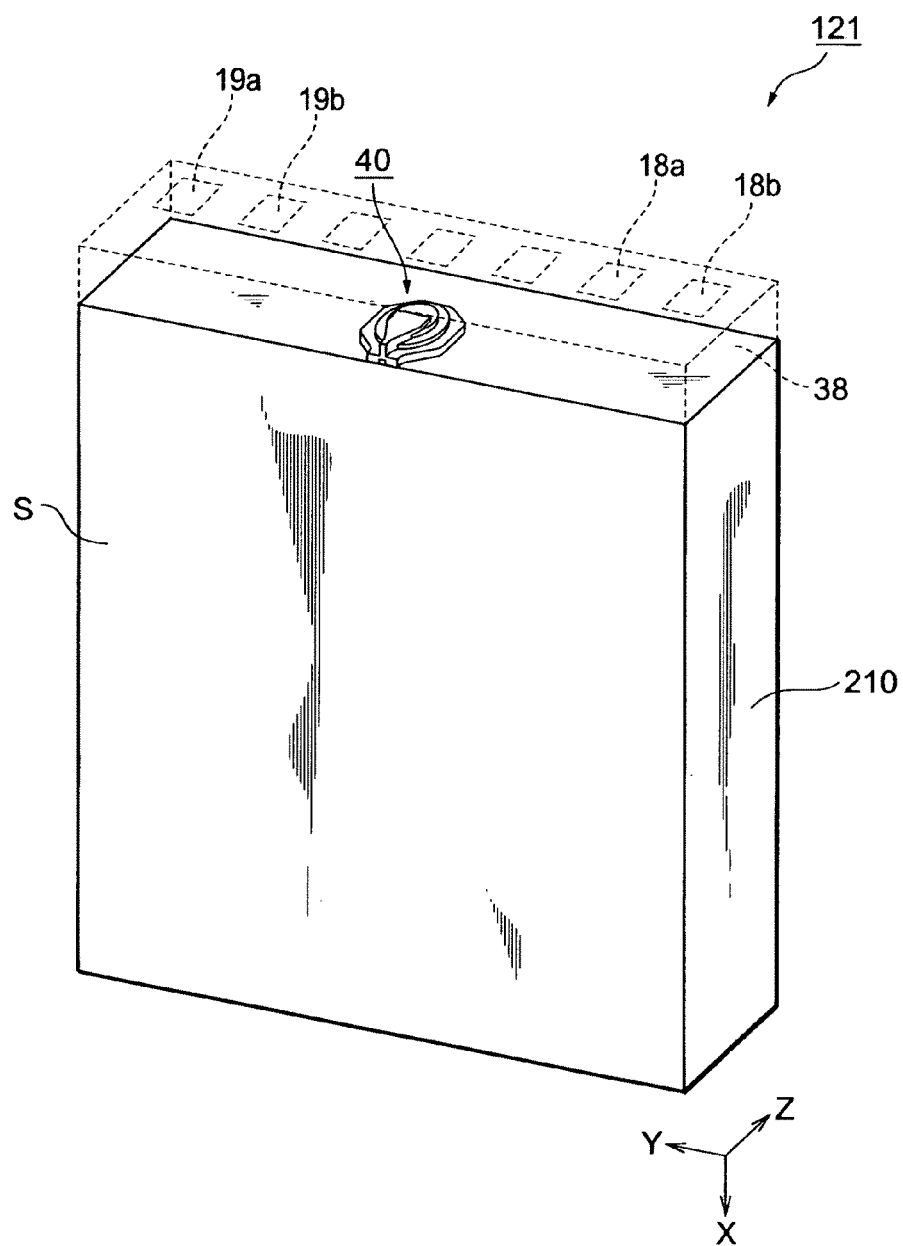
FIG. 3 is an enlarged perspective view near a magnetic head shown in FIG. 1.

FIG. 3 is an enlarged perspective view of the magnetic head 121. The magnetic head 121 is one in which a magnetic head part 40 is formed on a side face of a slider substrate 210, mainly made of AlTiC ($Al_2O_3.TiC$). The surface on the front side of the drawing is the medium-opposing surface (ABS) S opposing the recording surface of the hard disk DK. When the hard disk DK rotates, airflows accompanying the rotation levitate the magnetic head 121, thereby separating the medium-opposing surface S from the recording surface of the hard disk DK. The medium-opposing surface S may have various designs for levitating the magnetic head 121. The magnetic head 121 is provided with an insulating layer 38 as an overcoat layer illustrated by broken lines.

Various pads such as recording pads 18a, 18b and reproducing pads 19a, 19b are attached onto the insulating layer 38 and electrically connected to wires (not depicted) provided on the driving arm 14 shown in FIG. 1. A coating of DLC (Diamond Like Carbon) or the like may be provided on the medium-opposing surface S.

The recording pads 18a, 18b are electrically connected to both coil ends of a data writing electromagnetic coil device 34 (see FIG. 4A), respectively, while the reproducing pads 19a, 19b are electrically connected to both ends of a functional layer 2A (see FIG. 4A) acting as a magnetoresistive device, respectively.

Figure 4A:
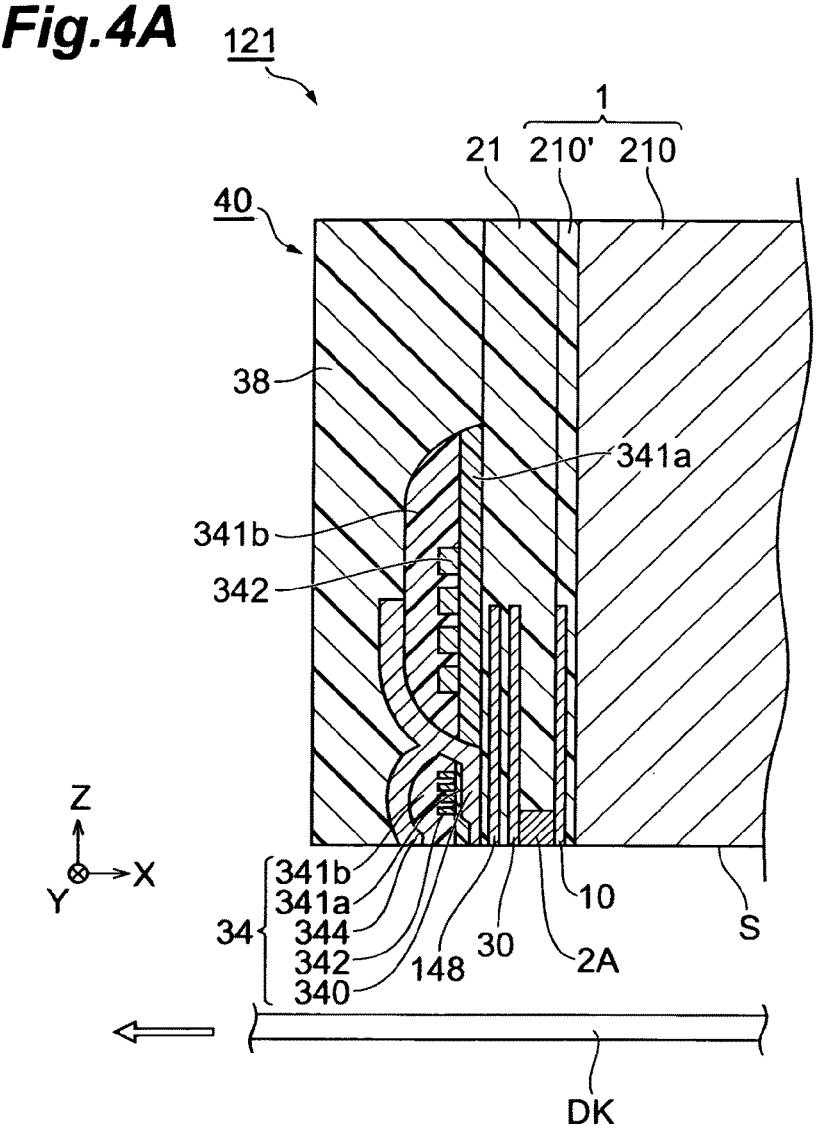
FIG. 4A is a sectional view of the magnetic head taken along a direction perpendicular to the medium-opposing surface.

FIG. 4A is a sectional view of the magnetic head 121 shown in FIG. 3 taken along a direction perpendicular to the medium-opposing surface S.

The magnetic head 121 comprises the slider substrate 210 and the magnetic head part 40 provided on a side face of the medium-opposing surface S in the slider substrate 210.

The magnetic head part 40 has a lower shield electrode layer 10 (lower magnetic shield layer), an upper shield electrode layer 30 (upper magnetic shield layer), the functional layer 2A as an MR (magnetoresistive) device arranged therebetween, and an electromagnetic coil device 34 as a magnetic recording device.

The lower shield electrode layer 10 and upper shield electrode layer 30 are planar layers formed substantially parallel to the side face (YZ plane) of the slider substrate 210, while the lower shield electrode layer 10 is located closer to the slider substrate 210 than is the upper shield electrode layer 30. The lower shield electrode layer 10 and upper shield electrode layer 30 form part of the medium-opposing surface S. The functional layer 2A is arranged such as to be held between the lower shield electrode layer 10 and upper shield electrode layer 30, and forms part of the medium-opposing surface S.

The lower shield electrode layer 10 and upper shield electrode layer 30 can be constructed by a magnetic material such as NiFe, CoFeNi, CoFe, FeN, or FeZrN having a thickness on the order of 0.5 to 3 µm formed by pattern plating including frame plating, for example. The lower shield electrode layer 10 and upper shield electrode layer 30 prevent the functional layer 2A from being affected by external magnetic fields which cause noises.

In this embodiment, the functional layer 2A is a current-perpendicular-to-plane (CPP) MR device in which a sense current flows in a direction perpendicular to its laminating surface, while a tunneling magnetoresistive (TMR) device or CPP giant magnetoresistive (GMR) device can favorably be used therefor. When such an MR device is used as the functional layer 2A, signal magnetic fields from magnetic disks can be sensed with a very high sensitivity.

Figure 4B:
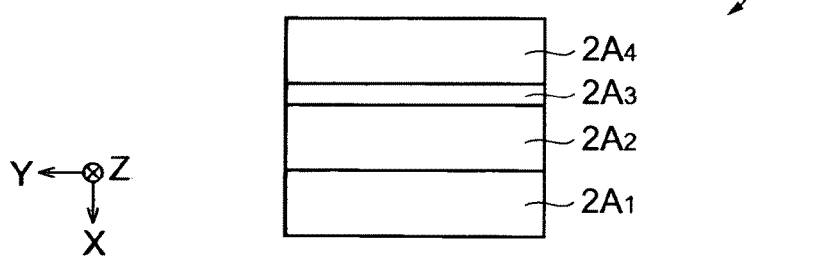
FIG. 4B is a plan view of a functional layer as seen in the direction perpendicular to the medium-opposing surface.

FIG. 4B is a plan view of the functional layer 2A as viewed in a direction perpendicular to the medium-opposing surface S in the case where the functional layer 2A is a TMR device. The functional layer 2A using the TMR device has a structure formed by successively laminating an antiferromagnetic layer $2A_1$ having a thickness on the order of 5 to 15 nm made of IrMn, PtMn, NiMn, RuRhMn, or the like; a magnetism pinned layer $2A_2$, constituted by CoFe which is a ferromagnetic material or two layers of CoFe or the like holding therebetween a nonmagnetic metal layer such as Ru, for example, having a direction of magnetization pinned by the antiferromagnetic layer; a tunnel barrier layer $2A_3$ made of a nonmagnetic dielectric material formed when a metal film having a thickness on the order of 0.5 to 1 nm is oxidized with oxygen introduced into a vacuum apparatus or naturally, for example; and a free magnetization layer $2A_4$, constituted by a two-layer film composed of CoFe or the like having a thickness on the order of 1 nm and NiFe or the like having a thickness on the order of 3 to 4 nm, which are ferromagnetic materials, for example, forming a tunnel junction with the magnetization pinned layer through the tunnel barrier layer. Thus, the functional layer 2A can construct the TMR device having the tunnel barrier layer $2A_3$ between the ferromagnetic material layers $2A_2$, $2A_4$ in the thin-film patterning method for a magnetoresistive device in accordance with this embodiment.

When a CPP GMR device is used as the functional layer 2A, the tunnel barrier layer in the above-mentioned TMR device is replaced with a nonmagnetic conductive layer made of Cu or the like having a thickness on the order of 1 to 3 nm. A metal gap layer made of Ru, Ta, or the like may be provided between the lower shield electrode layer 10 and functional layer 2A and between the functional layer 2A and upper shield electrode layer 30, so as to prevent the shield layers 10, 30 from magnetically coupling with each other.

As shown in FIG. 4A, an interdevice shield layer 148 made of a material similar to that of the upper shield electrode layer 30 is formed between the upper shield electrode layer 30 and electromagnetic coil device 34. The interdevice shield layer 148 acts to block the functional layer 2A from magnetic fields generated by the electromagnetic coil device 34 and prevent external noises from occurring at the time of reading. A backing coil part may further be formed between the interdevice shield layer 148 and electromagnetic coil device 34. The backing coil part generates a magnetic flux which cancels a magnetic flux loop traveling the upper and lower electrode layers of the functional layer 2A after being caused by the electromagnetic coil device 34, so as to suppress the phenomenon of wide adjacent track erasure (WATE) which is an unnecessary writing or erasing action for a magnetic disk.

An insulating layer 21 is formed on the side of the functional layer 2A opposite from the medium-opposing surface S, while the insulating layer 38 as an overcoat is formed on the YZ plane of the insulating layer 21. The insulating layers 21, 38 can be constructed by alumina or the like, for example.

The electromagnetic coil device 34 is preferably one for perpendicular recording, and comprises a main magnetic pole layer 340, a gap layer 341a, a coil insulating layer 341b, a coil layer 342, and an auxiliary magnetic pole layer 344 as shown in FIG. 4A.

The main magnetic pole layer 340 is a magnetism guiding path for guiding a magnetic flux induced by the coil layer 342 to a recording layer to be written in the magnetic disk (medium) DK, while converging the magnetic flux. The magnetic disk DK travels along the arrowed direction of FIG. 4A. Preferably, the width in the track width direction (direction along the Y axis of FIG. 4A) and size in the laminating direction (direction along the X axis of FIG. 4A) of the end part of the main magnetic pole layer 340 on the medium-opposing surface S side are made small. As a result, fine, strong writing magnetic fields adapted to higher recording densities can be generated.

The end part on the medium-opposing surface S side of the auxiliary magnetic pole layer 344 magnetically coupled to the main magnetic pole layer 340 forms a trailing shield part having a layer cross section larger than that in the remaining part of the auxiliary magnetic pole layer 344. The auxiliary magnetic pole layer 344 opposes the end part of the main magnetic pole layer 340 on the medium-opposing surface S side through the gap layer 341a and coil insulating layer 341b formed by insulating materials such as alumina. Providing such an auxiliary magnetic pole layer 344 makes the magnetic field gradient steeper between the auxiliary magnetic pole layer 344 and main magnetic pole layer 340 in the vicinity of the medium-opposing surface S. As a result, jitter in signal outputs decreases, whereby the error rate at the time of reading can be lowered.

The auxiliary magnetic pole layer 344 is constituted by an alloy made of two or three of Ni, Fe, and Co formed by frame plating, sputtering, or the like, an alloy mainly composed of them and doped with a predetermined element, or the like having a thickness of about 0.5 to about 5 µm, for example.

The gap layer 341a separates the coil layer 342 and main magnetic pole layer 340 from each other, and is constituted by $Al_2O_3$, DLC, or the like having a thickness of about 0.01 to about 0.5 µm formed by sputtering, CVD, or the like, for example.

The coil layer 342 is constituted by Cu or the like having a thickness of about 0.5 to about 3 µm formed by frame plating or the like, for example. The rear end of the main magnetic pole layer 340 and a part of the auxiliary magnetic pole layer 344 distanced from the medium-opposing surface S are connected to each other, while the coil layer 342 is formed so as to surround their connected part.

The coil insulating layer 341b separates the coil layer 342 and auxiliary magnetic pole layer 344 from each other, and is constituted by an electrically insulating material such as thermally cured alumina, a resist layer, or the like having a thickness of about 0.1 to about 5 µm, for example.

On the side of the electromagnetic coil device 34 opposite from the slider substrate 210, the insulating layer 38 as an overcoat layer is formed such as to cover the electromagnetic coil device 34. In the drawing, an insulating layer 210' is formed on the slider substrate 210, and they construct a substrate 1.

The device patterning method in accordance with the embodiment will now be explained.

The following steps (1) to (13) are successively performed in this patterning method:
(1) Functional layer forming step
(2) First mask layer forming step
(3) Resist forming step
(4) First mask layer etching step
(5) Resist removing step
(6) Second mask layer forming step
(7) Second mask layer etching step
(8) First mask layer removing step
(9) Functional layer etching step
(10) Bias layer forming step
(11) Surface polishing step
(12) MR height defining lithography step
(13) Upper shield electrode layer forming step The above-mentioned steps (1) to (13) will now be explained individually in detail.

(1) Functional Layer Forming Step

Figure 7A:
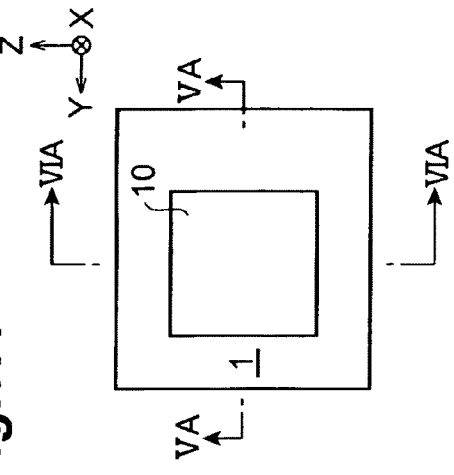
FIG. 7A is a plan view of the TMR device intermediate for explaining the manufacturing method in accordance with the embodiment.
Figure 6A:
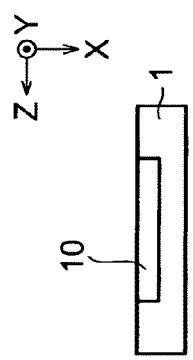
FIG. 6A is a sectional view of the TMR device intermediate for explaining the manufacturing method in accordance with the embodiment.
Figure 5A:
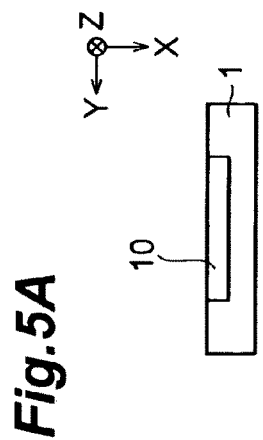
FIG. 5A is a sectional view of a TMR device intermediate for explaining a manufacturing method in accordance with the embodiment.

FIGS. 5A and 6A are sectional views of a TMR device intermediate for explaining the manufacturing method in accordance with the embodiment. FIG. 7A is a plan view of the TMR device intermediate, while FIGS. 5A and 6A show respective cross sections of the TMR device intermediate taken along the lines VA-VA and VIA-VIA in FIG. 7A.

According to the above-mentioned XYZ coordinate system, the surface of the substrate 1 is parallel to the YZ plane, while its thickness direction aligns with the X-axis direction. More specifically, the XY plane in FIG. 5A corresponds to the medium-opposing surface S shown in FIG. 4A, the Y-axis direction coincides with the track width direction, and the Z-axis direction coincides with the MR height direction.

First, the lower shield electrode layer 10 is formed on the substrate 1 made of an insulating substrate (e.g., AlTiC). The lower shield electrode layer 10 may be either embedded or not in the substrate as long as its surface is exposed. Thus, the lower shield electrode layer 10 is formed on the main surface of the substrate 1.

Figure 7B:
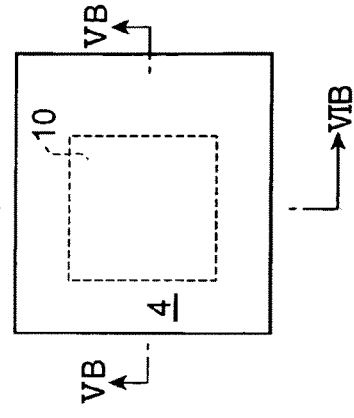
FIG. 7B is a plan view of the TMR device intermediate for explaining the manufacturing method in accordance with the embodiment.
Figure 6B:
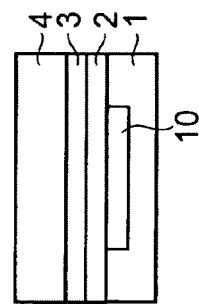
FIG. 6B is a sectional view of the TMR device intermediate for explaining the manufacturing method in accordance with the embodiment.
Figure 5B:
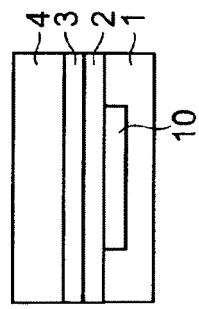
FIG. 5B is a sectional view of a TMR device intermediate for explaining the manufacturing method in accordance with the embodiment.

FIGS. 5B and 6B are sectional views of a TMR device intermediate for explaining the manufacturing method in accordance with the embodiment. FIG. 7B is a plan view of the TMR device intermediate, while FIGS. 5B and 6B show respective cross sections of the TMR device intermediate taken along the lines VB-VB and VIB-VIB in FIG. 7B.

Next, a TMR (Tunnel Magneto Resistive) device layer as a functional layer 2 is formed on the lower shield electrode layer 10. Here, the main surface is assumed to be a surface perpendicular to the thickness direction. The functional layer 2 as the TMR device layer is formed on the main surface of the substrate 1, and has a tunnel barrier layer interposed between a pinned layer made of a ferromagnetic body and a free layer which are not shown. The barrier layer is constituted by an insulating layer made of at least one species selected from $Al_2O_3$, MgO, ZnO, and the like, for example. The present invention is applicable not only to TMR but also to other CPP (Current-Perpendicular-to-Plane) reproducing devices by changing the material for the above-mentioned barrier layer as a matter of course. The pinned layer is exchange-coupled to an antiferromagnetic layer when necessary.

(2) First Mask Layer Forming Step

Next, a first mask layer 4 is formed above the functional layer 2. The first mask layer 4 in this embodiment is made of $SiO_2$. Before forming the mask layer 4, an etching stop layer 3 is formed on the main surface of the functional layer 2. Namely, after forming the etching stop layer 3, the first mask layer 4 is formed on the main surface of the etching stop layer 3. The etching stop layer 3 is made of a material exhibiting a lower etching rate to an etching gas in step (9) than that of the first mask layer 4. The etching stop layer 3 is made of NiFe (permalloy) in this embodiment.

(3) Resist Forming Step

Figure 7C:
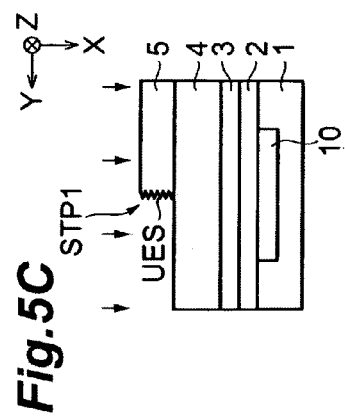
FIG. 7C is a plan view of the TMR device intermediate for explaining the manufacturing method in accordance with the embodiment.
Figure 6C:
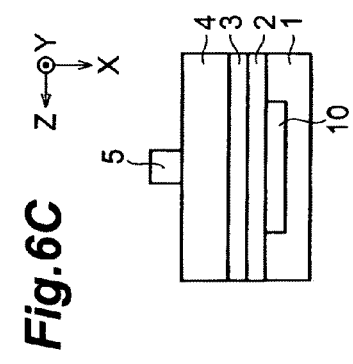
FIG. 6C is a sectional view of the TMR device intermediate for explaining the manufacturing method in accordance with the embodiment.
Figure 5C:
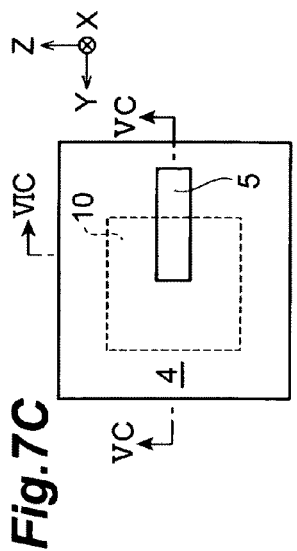
FIG. 5C is a sectional view of a TMR device intermediate for explaining the manufacturing method in accordance with the embodiment.

FIGS. 5C and 6C are sectional views of a TMR device intermediate for explaining the manufacturing method in accordance with the embodiment. FIG. 7C is a plan view of the TMR device intermediate, while FIGS. 5C and 6C show respective cross sections of the TMR device intermediate taken along the lines VC-VC and VIC-VIC in FIG. 7C.

After forming the first mask layer 4, a patterned resist 5 is formed on the first mask layer 4. Lithography is used for patterning the resist 5. Namely, a resist is applied to the whole exposed main surface of the first mask layer 4, exposure is then performed such that an edge of the resist 5 is located at a position where a track width of the TMR device is formed, and a developing process is performed thereafter.

When the resist 5 is exposed to light, an organic material in a partial area thereof is cured by a crosslinking reaction or the like, and the cured part remains after the developing process. The resist includes those of positive and negative types. Areas irradiated with exposure light (including not only ultraviolet rays but also electron beams) become soluble and insoluble to a chemical reaction in positive and negative resists, respectively.

In the case of a positive resist, the area on the left side of the drawings is irradiated with the exposure light, and the area on the right side of FIGS. 5C and 7C remains after the developing process. Here, a step STP is formed at an edge on the periphery of the resist 5, while a side face UES of the step STP is formed with irregularities caused by interference of the exposure light.

(4) First Mask Layer Etching Step

Thereafter, using the patterned resist 5, the first mask layer 4 is etched. Dry etching, which is preferably reactive ion etching (RIE), is used for this etching. $CF_4$ can be used as the etching gas.

Figure 7D:
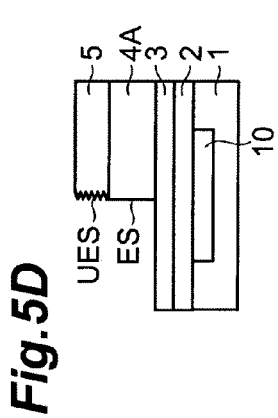
FIG. 7D is a plan view of the TMR device intermediate for explaining the manufacturing method in accordance with the embodiment.
Figure 6D:
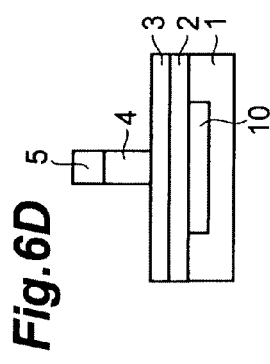
FIG. 6D is a sectional view of the TMR device intermediate for explaining the manufacturing method in accordance with the embodiment.
Figure 5D:
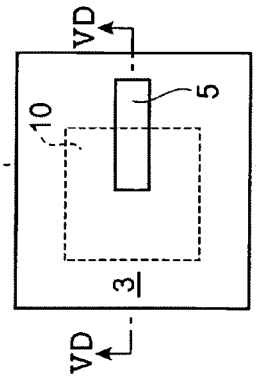
FIG. 5D is a sectional view of a TMR device intermediate for explaining the manufacturing method in accordance with the embodiment.

FIGS. 5D and 6D are sectional views of a TMR device intermediate for explaining the manufacturing method in accordance with the embodiment. FIG. 7D is a plan view of the TMR device intermediate, while FIGS. 5D and 6D show respective cross sections of the TMR device intermediate taken along the lines VD-VD and VID-VID in FIG. 7D.

As shown in these drawings, the area formed with the resist 5 in the first mask layer 4 is not etched, while the area not formed with the resist 5 is etched. The etching rate $V_{ES}$ of the etching stop layer 3 with respect to the etching gas is sufficiently smaller than the etching rate $V_{M1}$ of the first mask layer 4A with respect to the etching gas ($V_{ES} < V_{M1}$), so that $V_{ES}/V_{M1} = 1/130$. This etching leaves the patterned first mask layer 4A directly under the resist 5, while exposing its side face ES. The side face ES attains a flatness higher than that of the side face UES.

(5) Resist Removing Step

Figure 7E:
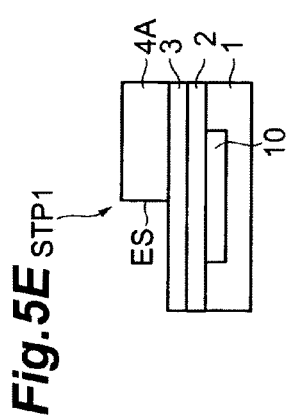
FIG. 7E is a plan view of the TMR device intermediate for explaining the manufacturing method in accordance with the embodiment.
Figure 6E:
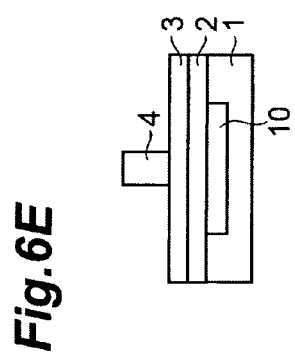
FIG. 6E is a sectional view of the TMR device intermediate for explaining the manufacturing method in accordance with the embodiment.
Figure 5E:
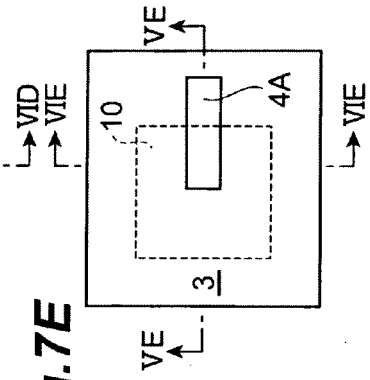
FIG. 5E is a sectional view of a TMR device intermediate for explaining the manufacturing method in accordance with the embodiment.

FIGS. 5E and 6E are sectional views of a TMR device intermediate for explaining the manufacturing method in accordance with the embodiment. FIG. 7E is a plan view of the TMR device intermediate, while FIGS. 5E and 6E show respective cross sections of the TMR device intermediate taken along the lines VE-VE and VIE-VIE in FIG. 7E.

After the first mask layer 4 is patterned as mentioned above, the substrate is dipped into an organic solvent such as acetone, so as to remove the resist 5. This exposes the main surface of the first mask layer 4A as well.

(6) Second Mask Layer Forming Step

Figure 5F:
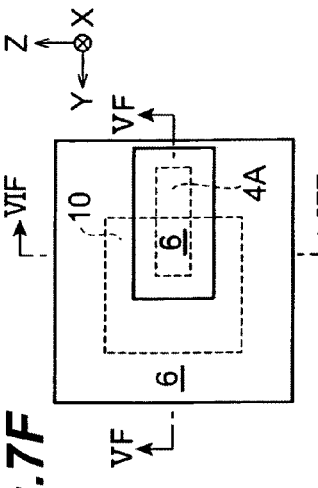
FIG. 5F is a sectional view of a TMR device intermediate for explaining the manufacturing method in accordance with the embodiment.
Figure 6F:
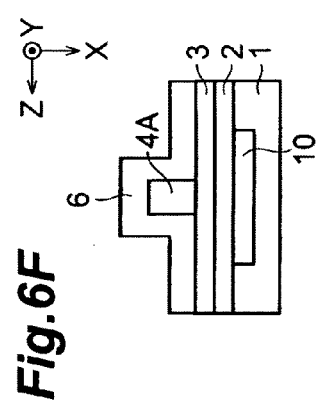
FIG. 6F is a sectional view of the TMR device intermediate for explaining the manufacturing method in accordance with the embodiment.
Figure 7F:
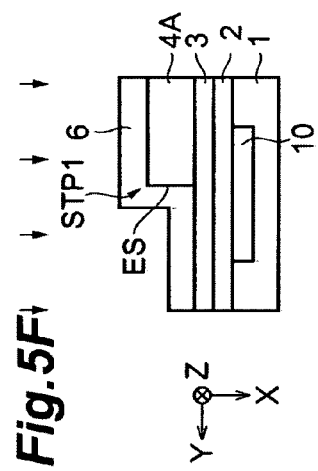
FIG. 7F is a plan view of the TMR device intermediate for explaining the manufacturing method in accordance with the embodiment.

FIGS. 5F and 6F are sectional views of a TMR device intermediate for explaining the manufacturing method in accordance with the embodiment. FIG. 7F is a plan view of the TMR device intermediate, while FIGS. 5F and 6F show respective cross sections of the TMR device intermediate taken along the lines VF-VF and VIF-VIF in FIG. 7F.

After removing the resist 5, a second mask layer 6 is formed on the whole exposed surface by ALD. Namely, the second mask layer 6 covers a step STP1. The step STP1 is defined by the edge having the side face ES of the first mask layer 4. The second mask layer 6 in this embodiment is made of $Al_2O_3$ (alumina).

The following is a method of forming $Al_2O_3$ by ALD in this embodiment.

First, TMA (trimethylaluminum) is introduced into a chamber in which the substrate is arranged. In this case, TMA is chemically adsorbed by the substrate surface. After the substrate surface is fully covered with TMA, the remaining gas within the chamber is discharged by a vacuum pump, whereby only one molecular adsorption layer ideally remains on the surface because of the repulsion between $CH_3$ groups contained in TMA. Next, $H_2O$ is introduced into the chamber, so that TMA and $H_2O$ react with each other, thereby producing $Al_2O_3$ and methane gas. Thereafter, the remaining gas in the chamber is discharged by the vacuum pump, whereby one molecular layer of $Al_2O_3$ can ideally be deposited. Repeatedly performing this monoatomic layer forming step thereafter can form the second mask layer 6 having a desirable thickness. The thickness of the second mask layer 6 can precisely be controlled on atomic layer order.

The second mask layer 6 is formed not only on the main surface of the etching stop layer 3 and the main surface of the first mask layer 4A, but also on the side face ES of the step STP1 positioned at the edge of the first mask layer 4A.

(7) Second Mask Layer Etching Step

Next, the second mask layer 6 is dry-etched in the thickness direction of the substrate 1, so as to leave the second mask layer 6A (see FIG. 5G) on only the side face ES of the step STP1. RIE is used for this dry etching. $CF_6$ can be used for an etching gas.

It will be more preferred if selectivity ratios between the individual materials are greater. This embodiment was carried out under the following condition. The etching rate $V_{ES}$ of the etching stop layer (permalloy) 3 with respect to the etching gas, the etching rate $V_{M1}$ of the first mask layer ($SiO_2$) 4 with respect to the etching gas, and the etching rate $V_{M2}$ of the second mask layer ($Al_2O_3$) 6 with respect to the etching gas had the following relationships:

$$V_{ES}/V_{M2} = 1/15$$

$$V_{M2}/V_{M1} = 1/8$$

$$V_{ES}/V_{M1} = 1/130$$

(8) First Mask Layer Removing Step

Figure 5G:
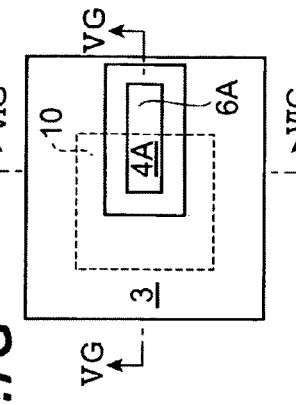
FIG. 5G is a sectional view of a TMR device intermediate for explaining the manufacturing method in accordance with the embodiment.
Figure 6G:
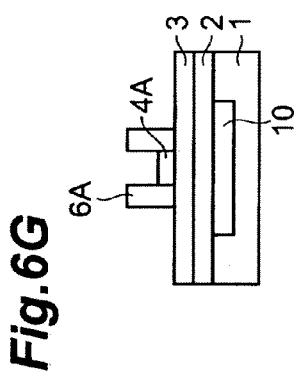
FIG. 6G is a sectional view of the TMR device intermediate for explaining the manufacturing method in accordance with the embodiment.
Figure 7G:
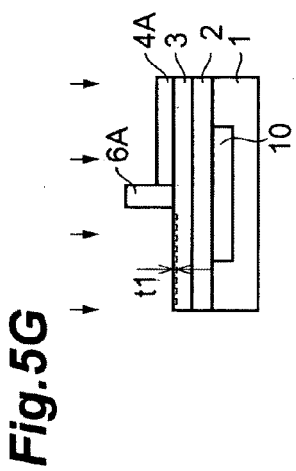
FIG. 7G is a plan view of the TMR device intermediate for explaining the manufacturing method in accordance with the embodiment.

FIGS. 5G and 6G are sectional views of a TMR device intermediate for explaining the manufacturing method in accordance with the embodiment. FIG. 7G is a plan view of the TMR device intermediate, while FIGS. 5G and 6G show respective cross sections of the TMR device intermediate taken along the lines VG-VG and VIG-VIG in FIG. 7G.

As the etching by RIE advances, the main surface of the etching stop layer 3 and the main surface of the first mask layer 4A are exposed at first. As the etching further progresses, the surface area of the etching stop layer 3 is slightly removed, while the first mask 4 is being eliminated. These drawings show a state where the etching stop layer 3 is removed by a thickness t1 (=0.6 nm). The second mask layer 6A deposited on the side face ES remains, while having such a form as to project perpendicularly from the substrate.

Figure 5H:
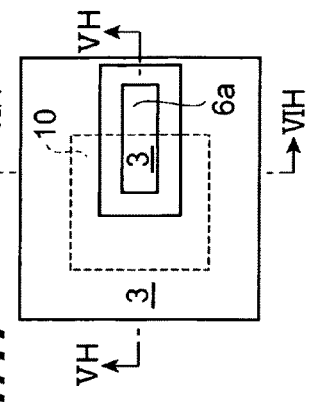
FIG. 5H is a sectional view of a TMR device intermediate for explaining the manufacturing method in accordance with the embodiment.
Figure 6H:
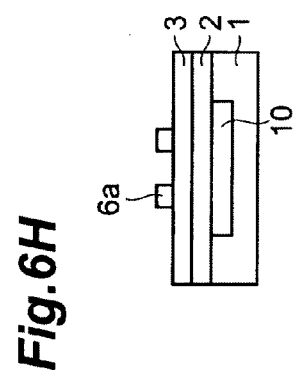
FIG. 6H is a sectional view of the TMR device intermediate for explaining the manufacturing method in accordance with the embodiment.
Figure 7H:
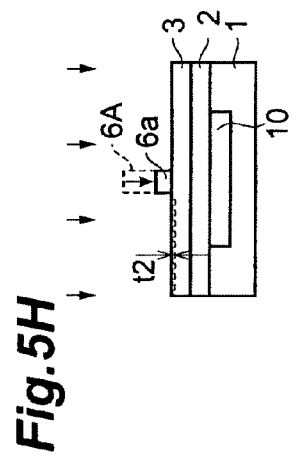
FIG. 7H is a plan view of the TMR device intermediate for explaining the manufacturing method in accordance with the embodiment.

FIGS. 5H and 6H are sectional views of a TMR device intermediate for explaining the manufacturing method in accordance with the embodiment. FIG. 7H is a plan view of the TMR device intermediate, while FIGS. 5H and 6H show respective cross sections of the TMR device intermediate taken along the lines VH-VH and VIH-VIH in FIG. 7H.

As the etching by RIE further advances, the etching stop layer 3 is removed by a thickness t2 (=0.78 nm), and the first mask layer 4A is completely eliminated, so that the main surface of the etching stop layer 3 under the first mask layer 4A shown in FIG. 5E is exposed. The top face of the remaining second mask layer 6A is also slightly etched, so as to reduce its height from the substrate surface, thereby finally leaving a minute mask 6a.

(9) Functional Layer Etching Step

After the first mask layer 4A is removed, the etching stop layer 3 and functional layer 2 are dry-etched by using the second mask layer 6a as a minute mask. The second mask layer 6a is a mask whose thickness in the lateral direction is the track width of the TMR device. This dry etching is ion milling with a rare gas (Ar), in which the exposed surfaces of the etching stop layer 3 and functional layer 2 are sputtered with atoms of the rare gas in the thickness direction of the substrate, so as to leave the etching stop layer 3A and the functional layer 2A as the TMR device, which have the thickness of the second mask layer 6a as a width.

FIGS. 5I and 6I are sectional views of a TMR device intermediate for explaining the manufacturing method in accordance with the embodiment. FIG. 7I is a plan view of the TMR device intermediate, while FIGS. 5I and 6I show respective cross sections of the TMR device intermediate taken along the lines VI-VI and VII-VII in FIG. 7I.

Under the second mask layer 6a, the above-mentioned ion milling leaves the etching stop layer 3A and functional layer 2A etched by using the second mask layer 6a as a mask. The width of the functional layer 2A is substantially identical to the thickness of the second mask layer 6a in the lateral direction.

(10) Bias Layer Forming Step

FIGS. 5J and 6J are sectional views of a TMR device intermediate for explaining the manufacturing method in accordance with the embodiment. FIG. 7J is a plan view of the TMR device intermediate, while FIGS. 5J and 6J show respective cross sections of the TMR device intermediate taken along the lines VJ-VJ and VIJ-VIJ in FIG. 7J.

After forming the functional layer 2A by dry etching, an insulating layer 7 made of $Al_2O_3$ or the like is formed on the exposed surface of the substrate, and a hard magnetic layer (hard magnet) 8 made of CoCrPt or the like is deposited on the insulating layer 7. Sputtering can be used for depositing them. The hard magnetic layer 8 is constituted by a bias layer 8A formed on both ends in the track width direction of the functional layer 2A acting as the TMR device and an unnecessary layer 8B formed above the functional layer 2A.

(11) Surface Polishing Step

FIGS. 5K and 6K are sectional views of a TMR device intermediate for explaining the manufacturing method in accordance with the embodiment. FIG. 7K is a plan view of the TMR device intermediate, while FIGS. 5K and 6K show respective cross sections of the TMR device intermediate taken along the lines VK-VK and VIK-VIK in FIG. 7K.

After forming the hard magnetic layer 8, the substrate surface is subjected to chemical mechanical polishing (CMP), so as to remove the unnecessary layer 8B, second mask layer 6a, and etching stop layer 3A, thereby exposing the functional layer 2A, while leaving the bias layer 8A.

(12) MR Height Defining Lithography Step

Figure 5L:
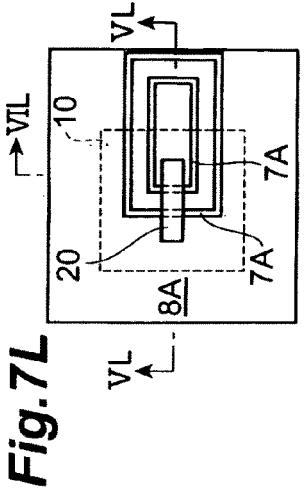
FIG. 5L is a sectional view of a TMR device intermediate for explaining the manufacturing method in accordance with the embodiment.
Figure 6L:
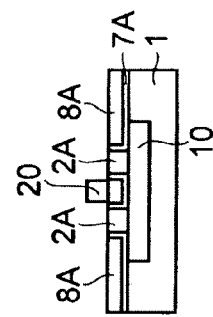
FIG. 6L is a sectional view of the TMR device intermediate for explaining the manufacturing method in accordance with the embodiment.
Figure 7L:
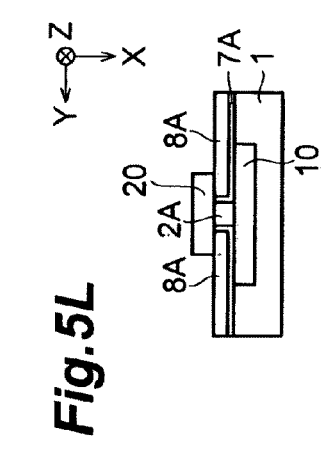
FIG. 7L is a plan view of the TMR device intermediate for explaining the manufacturing method in accordance with the embodiment.

FIGS. 5L and 6L are sectional views of a TMR device intermediate for explaining the manufacturing method in accordance with the embodiment. FIG. 7L is a plan view of the TMR device intermediate, while FIGS. 5L and 6L show respective cross sections of the TMR device intermediate taken along the lines VL-VL and VIL-VIL in FIG. 7L.

A mask 20 having a predetermined width in the MR height direction (Z-axis direction) is formed on the functional layer 2A. Namely, after applying a resist onto the exposed substrate surface, a rectangular pattern extending in a direction (Y-axis direction) traversing the functional layer 2A is patterned by lithography.

Figure 5M:
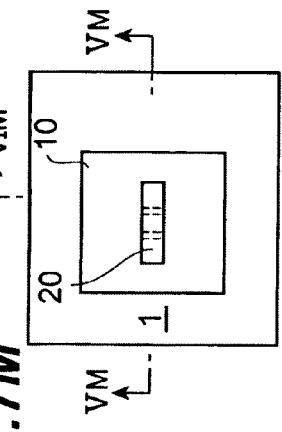
FIG. 5M is a sectional view of a TMR device intermediate for explaining the manufacturing method in accordance with the embodiment.
Figure 6M:
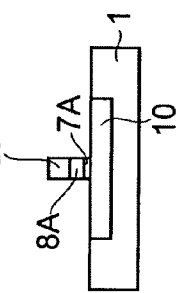
FIG. 6M is a sectional view of the TMR device intermediate for explaining the manufacturing method in accordance with the embodiment.
Figure 7M:
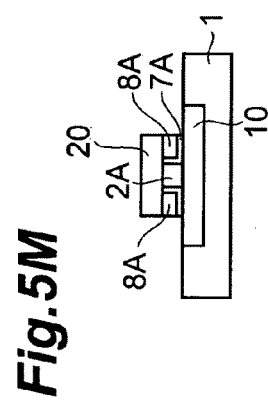
FIG. 7M is a plan view of the TMR device intermediate for explaining the manufacturing method in accordance with the embodiment.

FIGS. 5M and 6M are sectional views of a TMR device intermediate for explaining the manufacturing method in accordance with the embodiment. FIG. 7M is a plan view of the TMR device intermediate, while FIGS. 5M and 6M show respective cross sections of the TMR device intermediate taken along the lines VM-VM and VIM-VIM in FIG. 7M.

After forming the mask 20 made of a resist, the hard magnetic layer 8 and insulating layer 7A on the periphery of the mask 20 are removed by dry etching using the mask 20, so that the main part of the TMR device including the functional layer 2 remains on the substrate. The above-mentioned milling or RIE can be used for the dry etching. The dry etching is stopped at the time when the lower shield electrode layer 10 is exposed. The dry etching defines the length of the functional layer 2A in the MR height direction.

(13) Upper Shield Electrode Layer Forming Step

Figure 5N:
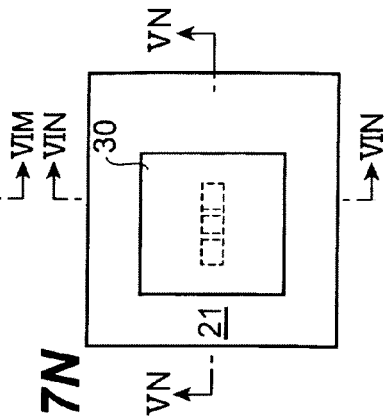
FIG. 5N is a sectional view of a TMR device intermediate for explaining the manufacturing method in accordance with the embodiment.
Figure 6N:
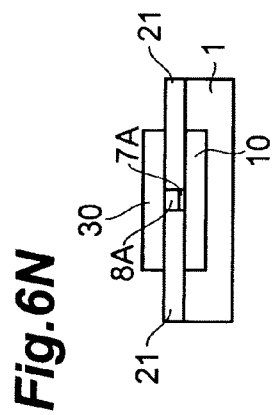
FIG. 6N is a sectional view of the TMR device intermediate for explaining the manufacturing method in accordance with the embodiment.
Figure 7N:
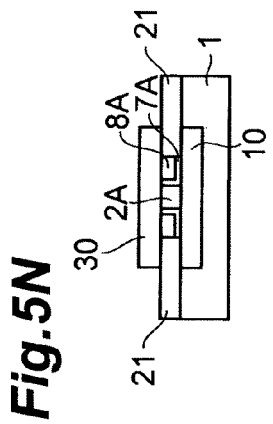
FIG. 7N is a plan view of the TMR device intermediate for explaining the manufacturing method in accordance with the embodiment.

FIGS. 5N and 6N are sectional views of a TMR device intermediate for explaining the manufacturing method in accordance with the embodiment. FIG. 7N is a plan view of the TMR device intermediate, while FIGS. 5N and 6N show respective cross sections of the TMR device intermediate taken along the lines VN-VN and VIN-VIN in FIG. 7N.

After the etching for defining the MR height is performed as mentioned above, the insulating layer 21 is deposited about the functional layer 2A and hard magnetic layer 8A, so as to attain the same height as that of the hard magnetic layer 8A, and the mask 20 is removed (lifted off) by an organic solvent. Thereafter, the upper shield electrode layer 30 is formed on the exposed main surface of the functional layer 2A acting as the TMR device, whereby a reading head (magnetic reader) is completed. Sputtering can be used for forming this layer.

Since the side face ES of the step STP1 of the first mask layer 4 has a higher flatness than that of the side face UES of the step STP of the resist 5, the thickness of the second mask layer 6 formed on the side face ES by ALD is controlled on atomic layer order in the manufacturing method explained in the foregoing. The functional layer 2 is etched, while the thickness direction of the second mask layer 6a is taken as the width direction (see FIG. 5I), whereby the functional layer 2A having a width on atomic layer order is formed.

Since the etching stop layer 3 is provided, the etching of the mask layers 6, 4A is automatically stopped without etching the functional layer 2, whereby precise etching is possible.

The above-mentioned functional layer 2 can be used not only for magnetoresistive devices, but also for various semiconductor device layers and metal wires.

The above-mentioned TMR device intermediate was formed as a film and observed by a scanning electron microscope (SEM).

Figure 8:
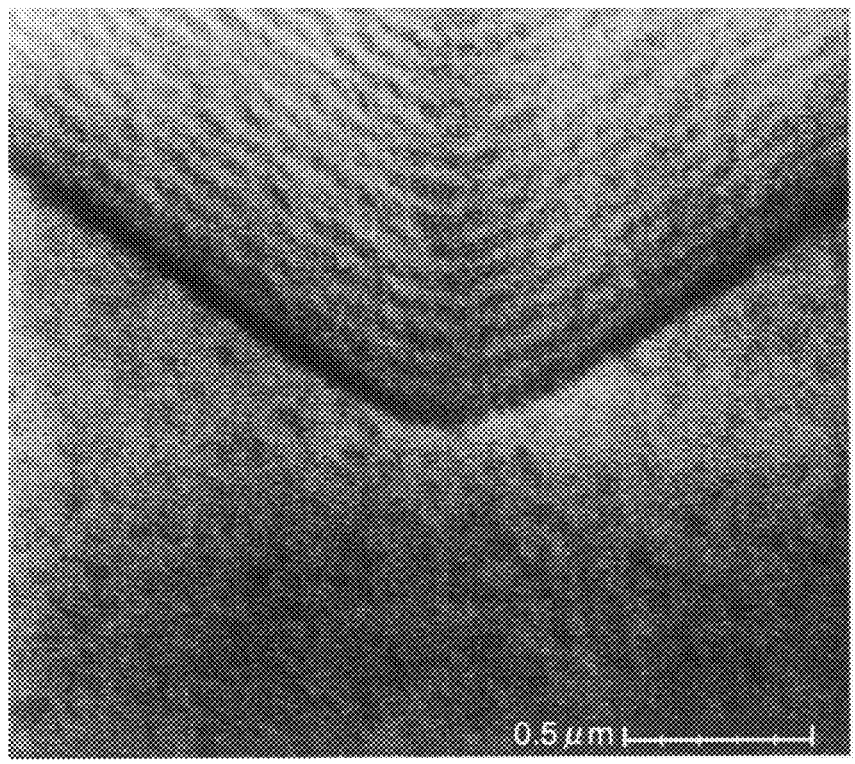
FIG. 8 is an electron micrograph of the TMR device intermediate after exposing a resist to light.

FIG. 8 is an electron micrograph of the vicinity of a step part (a corner part of the resist 5 seen as a plane) of the TMR device intermediate after exposing the resist to light as shown in FIG. 7C. Interference fringes are formed within the resist.

Figure 9:
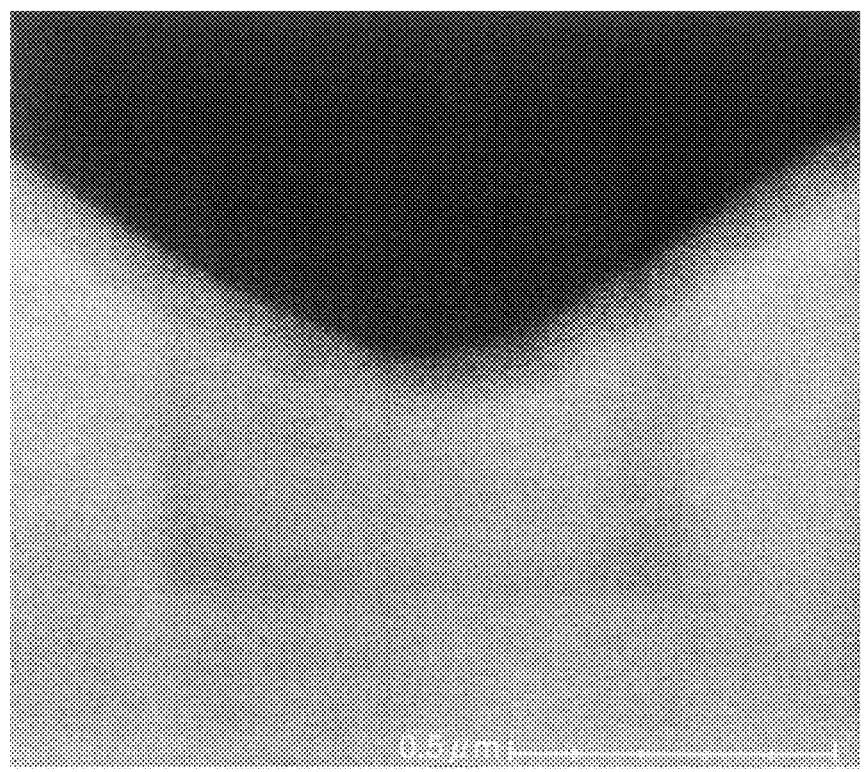
FIG. 9 is an electron micrograph of the TMR device intermediate after peeling off the resist.

FIG. 9 is an electron micrograph of the TMR device intermediate after peeling off the resist as shown in FIG. 7E. The observed location is the same as that of FIG. 8.

Figure 10:
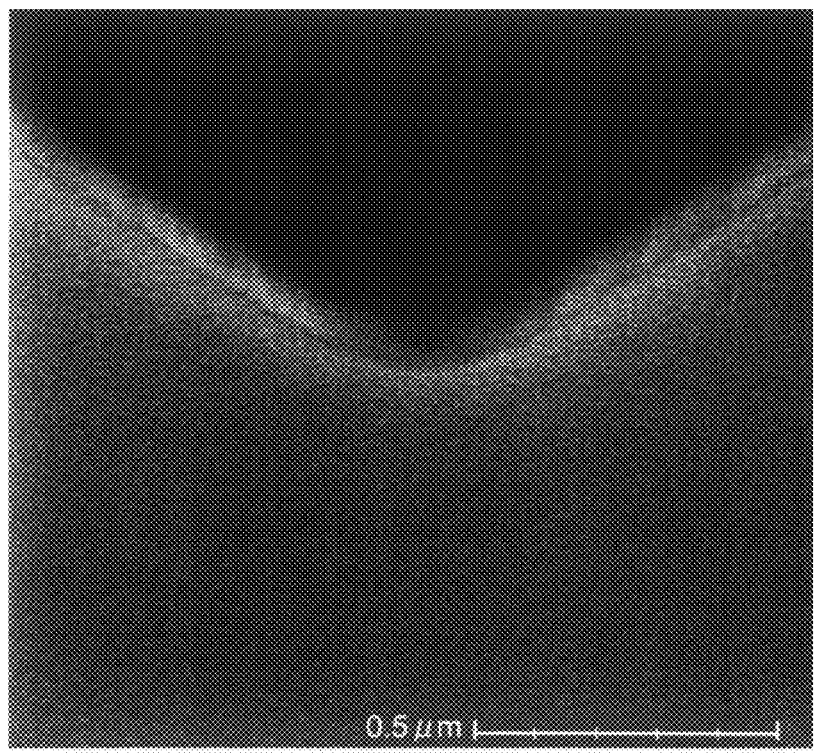
FIG. 10 is an electron micrograph of the TMR device intermediate after depositing alumina by ALD.

FIG. 10 is an electron micrograph of the TMR device intermediate after depositing alumina as the second mask layer 6 by a thickness of 20 nm by ALD as shown in FIG. 7F. The observed location is the same as that of FIG. 8.

Figure 11:
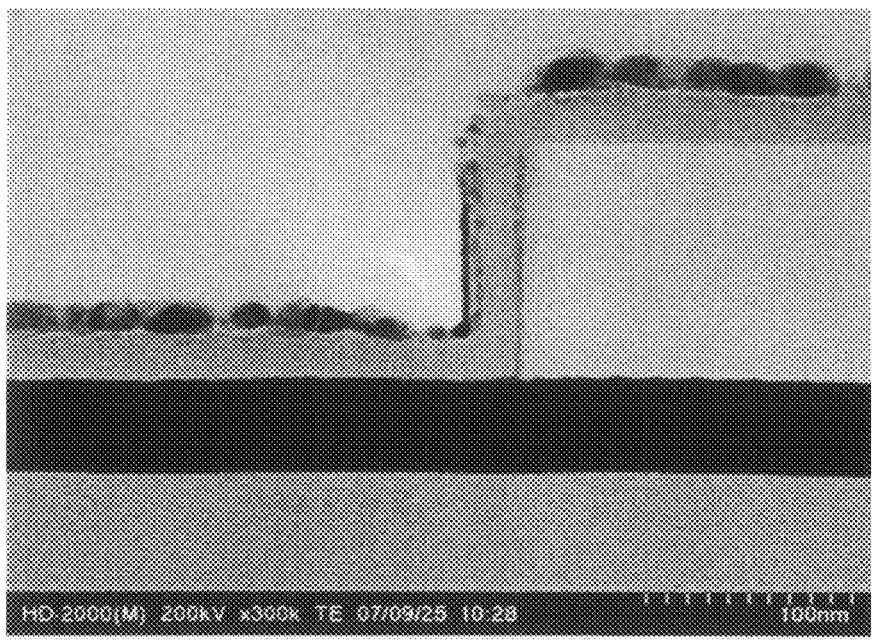
FIG. 11 is an electron micrograph of a cross section of the TMR device after depositing alumina by ALD.

FIG. 11 is an electron micrograph of a cross section of the TMR device shown in FIG. 5F. For microscopy, a Cu film is deposited on the second mask layer 6, so as to prevent the insulator (second mask layer 6) from charging up during the microscopic observation. As shown in FIG. 11, the side face of the step is flat, while a mask layer having a precise thickness is formed on the side face.

Figure 12:
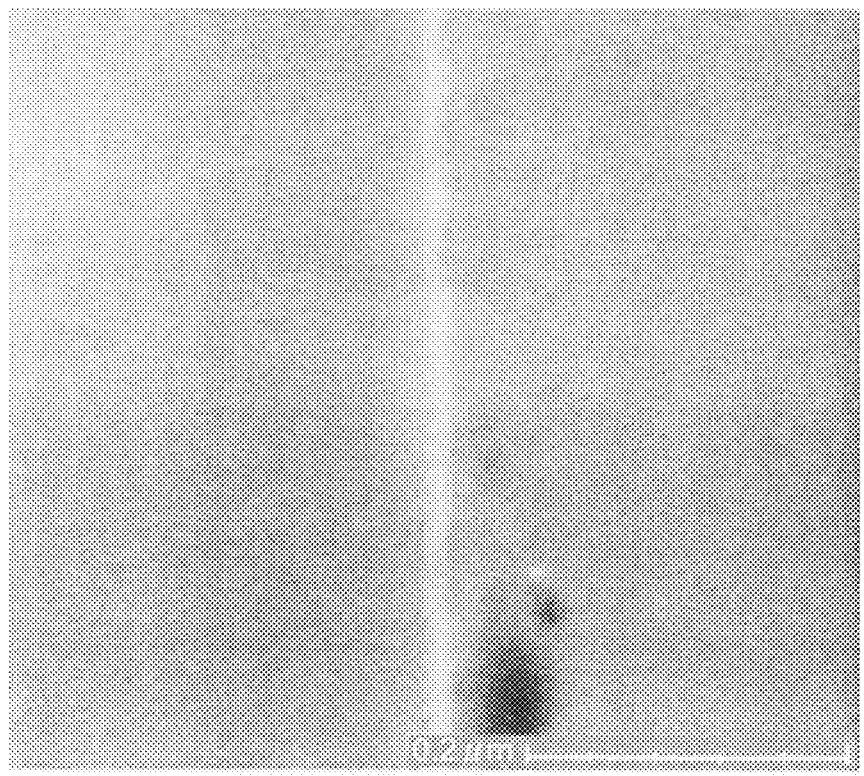
FIG. 12 is an electron micrograph of a cross section of the TMR device after etching alumina by RIE.

FIG. 12 is an electron micrograph of the TMR device intermediate as seen from thereabove. A functional layer etched into a thin line having a width of 25 nm can be recognized. Namely, it has been verified that the etching is performed precisely, though with a width slightly greater than the thickness of 20 nm of the second mask layer 6.

Since the irregularities of the side face UES are too large to ignore, a mask having a precise width cannot be formed if the second mask layer 6 is directly formed on the resist 5 without using the first mask layer 4A.

It is thus clear that the above-mentioned method can form a TMR device having a track width which has not conventionally been attainable, while reducing fluctuations in principle.

The reading head equipped with such a TMR device comprises a pair of bias layers 8A made of a hard magnetic body (see FIG. 5K) and a TMR device (functional layer 2A) positioned between side faces of the bias layers 8A, while the TMR device has a track width of 25 nm. The pair of bias layers 8A are separated from each other in a direction perpendicular to the thickness direction.

In this case, the track width can be made narrow as in this embodiment, so that magnetic information stored in a minute area can be read, whereby changes in the direction of magnetization from the outside can fully be sensed. Here, the width of the TMR device in the track width direction is assumed to be defined by an average value.

Without enhancing performances of existing apparatus, reproducing devices having a narrow required track width of about 80 nm or less can be formed with a high precision and small fluctuations in principle.

What is claimed is:

1. A thin-film patterning method for a magnetoresistive device, the method comprising the steps of:
    (a) forming a functional layer on a substrate, wherein the functional layer constitutes a tunneling magnetoresistive (TMR) device having a tunnel barrier layer between ferromagnetic material layers, and the tunnel barrier layer is made of at least one species selected from $Al_2O_3$, MgO and ZnO;
    (b) forming a first mask layer above the functional layer;
    (c) forming a patterned resist on the first mask layer;
    (d) etching the first mask layer by using the resist;
    (e) removing the resist;
    (f) forming a second mask layer of $Al_2O_3$ by atomic layer deposition, the second mask layer covering a step defined by an edge of the first mask layer, wherein the atomic layer deposition is performed by using reaction between trimethylaluminum (TMA) and $H_2O$,
    (g) dry-etching the second mask layer in a thickness direction of the substrate so as to leave the second mask layer on a side face of the step;
    (h) removing the first mask layer so as to expose the functional layer under the first mask; and
    (i) ion milling the functional layer by using the second mask layer.

2. A thin-film patterning method for a magnetoresistive device according to claim 1, further comprising the step of forming an etching stop layer on the functional layer before forming the first mask layer, the etching stop layer being made of a material exhibiting a lower etching rate to an etching gas in step (i) than that of the first mask layer.

3. A thin-film patterning method for a magnetoresistive device according to claim 1, wherein the second mask layer exhibits a lower etching rate to an etching gas in step (g) than that of the first mask layer.

4. A thin-film patterning method for a magnetoresistive device according to claim 3, wherein the first mask layer is made of $SiO_2$.

* * * * *